(12) United States Patent
Su et al.

(10) Patent No.: US 11,671,428 B2
(45) Date of Patent: Jun. 6, 2023

(54) GRANTING ACCESS TO UPGRADE RESOURCE WITH EXISTING AUTHORIZATION INFRASTRUCTURE

(71) Applicant: EMC IP Holding Company LLC, Hopkinton, MA (US)

(72) Inventors: Lihui Su, Shanghai (CN); Yujun Liang, Shanghai (CN); James Morton, Adamstown, MD (US); Ming Zhang, Shanghai (CN); Min Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 264 days.

(21) Appl. No.: 16/906,881

(22) Filed: Jun. 19, 2020

(65) Prior Publication Data

US 2021/0400043 A1 Dec. 23, 2021

(51) Int. Cl.
*H04L 9/40* (2022.01)
*G06F 8/65* (2018.01)
*G06F 18/22* (2023.01)

(52) U.S. Cl.
CPC ............ *H04L 63/0892* (2013.01); *G06F 8/65* (2013.01); *G06F 18/22* (2023.01); *H04L 63/0807* (2013.01)

(58) Field of Classification Search
CPC ... H04L 63/0892; H04L 63/0807; G06F 8/65; G06F 21/57; G06K 9/6215
See application file for complete search history.

(56) References Cited

U.S. PATENT DOCUMENTS

| | | | |
|---|---|---|---|
| 2020/0007418 A1* | 1/2020 | Greenstein | G06F 9/5077 |
| 2020/0089420 A1* | 3/2020 | Sharoni | G06F 3/0622 |
| 2020/0151335 A1* | 5/2020 | Ayoub | H04W 12/03 |

* cited by examiner

*Primary Examiner* — Charles C Jiang
*Assistant Examiner* — Shawn D Miller
(74) *Attorney, Agent, or Firm* — Dergosits & Noah LLP; Todd A. Noah (57) ABSTRACT

Described is a system for preventing unauthorized access to an upgrade implementation module while an authentication-authorization service is offline. Various embodiments of the upgrade implementation module record an upgrade token generated by a system manager. The upgrade implementation module sets an authentication-authorization service to an offline mode. The upgrade implementation module determines a match between a received upgrade token and the recorded upgrade token in order to prevent unauthorized access of the upgrade implementation module. In response to determining the match, the upgrade implementation module authorizes implementation of an upgrade package associated with the upgrade token while the authentication-authorization service is in the offline mode.

20 Claims, 6 Drawing Sheets

```
                   ─504
{       ↙
    "id": "0340a247-25da-44ff-8a74-94f9bbd1b613", "name": "Dell EMC PowerProtect Data Manager - Major Release", "packageVersion": "19.3.0-1", "type": "RELEASE",
                                              ─502
    ...                                   ↙

"upgradeToken": "7b54d224-bd66-42ec-b104-46cf9325f36c "

GRANTING ACCESS TO UPGRADE RESOURCE WITH EXISTING AUTHORIZATION INFRASTRUCTURE

TECHNICAL FIELD

This disclosure relates to system upgrades, and more particularly, validating access for implementation of system upgrades.

BACKGROUND

Conventional systems require installation of an entire and a separate upgrade application. Conventional upgrade techniques are directed to a whole system in its entirety which first requires upgrading the separate upgrade application itself and then applying all upgrades to the whole system. Such conventional upgrade techniques incur extra costs and management overheads from having to manage different upgrading phases from the separate upgrade application and then to the whole underlying system. In addition, conventional upgrade techniques result in various functionalities becoming unavailable during upgrade. Continually losing access to certain functionalities for each upgrade cycle is disruptive and inefficient.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Described herein are various embodiments for a system, method and computer program product for preventing unauthorized access to an upgrade implementation module while an authentication-authorization service is offline. The upgrade implementation module allows for the proper validation of access even though the authentication-authorization service is not available to grant and validate access tokens. Various embodiments of the upgrade implementation module record an upgrade token generated by a system manager. The upgrade implementation module sets an authentication-authorization service to an offline mode. The upgrade implementation module determines a match between a received upgrade token and the recorded upgrade token in order to prevent unauthorized access of the upgrade implementation module. In response to determining the match, the upgrade implementation module authorizes implementation of an upgrade package associated with the upgrade token while the authentication-authorization service is in the offline mode.

The upgrade implementation module provides many benefits in contrast with the limitations of conventional systems. The upgrade implementation module provides the advantages of protection of unauthorized access of its own upgrade implementation module APIs even after an authentication-authorization service is taken offline (i.e. shut down), whereby the authentication-authorization service is designated for the distribution, management and validation of access tokens.

According to various embodiments, the upgrade implementation module determines a match between a client system's upgrade token and the recorded upgrade token in order to prevent unauthorized access of the upgrade implementation module while the authentication-authorization service, a system manager and a plurality of services are each in respective offline modes.

In some embodiments, the upgrade implementation module sets the authentication-authorization service, the system manager and the plurality of services offline in response to a client system upgrade package being uploaded to the system manager. According to various embodiments, the upgrade implementation module, the system manager, the authentication-authorization service and the plurality of services are associated with a cloud-based data protection and replication platform.

According to various embodiments, the upgrade implementation module may operate remotely from an Upgrade Engine that generates the upgrade implementation module and provides access to the upgrade implementation module for deployment of the upgrade implementation module in the cloud-based data protection and replication platform.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

Figure 1:
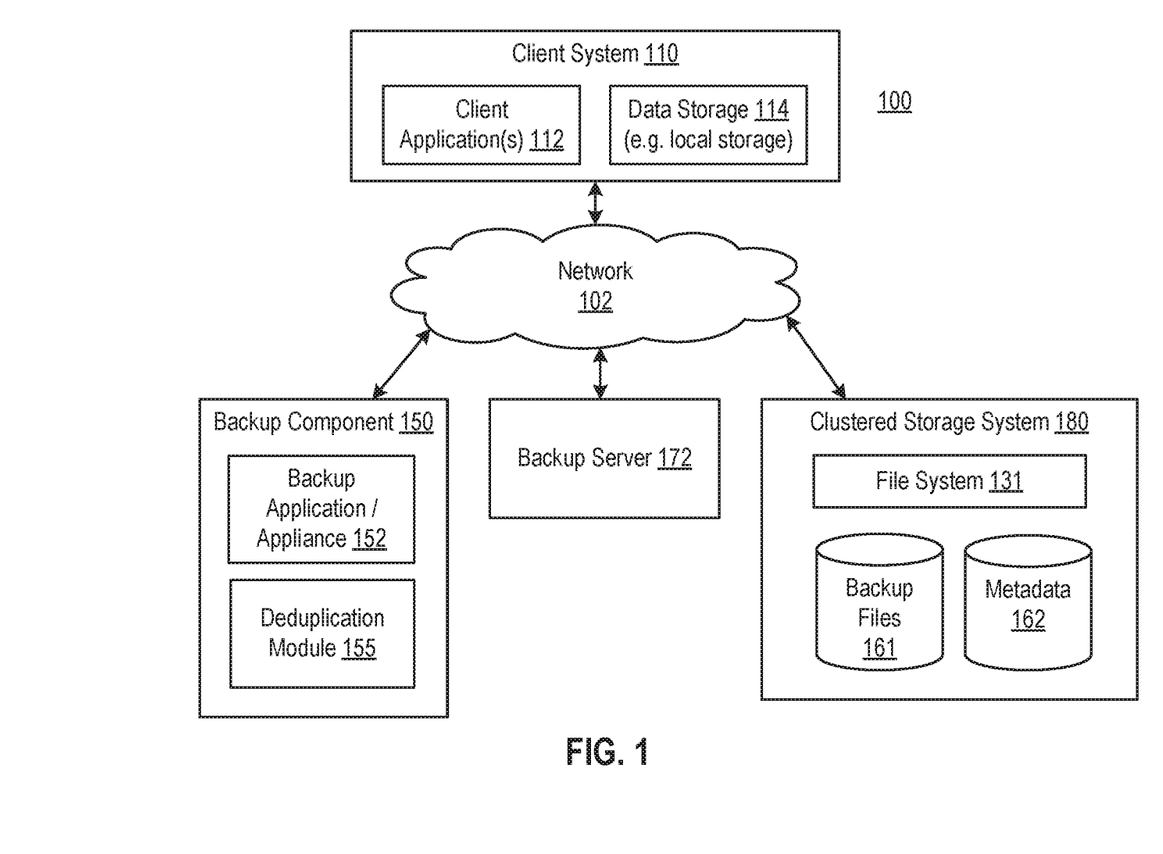
FIG. 1 is a block diagram illustrating an example operating environment according to one or more embodiments of the disclosure.

More specifically, and with reference to FIG. 1, shown is a block diagram illustrating an example of an operating environment 100 for distributing phases of deduplication processing within a clustered storage environment according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC Avamar server or a Dell EMC Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data.

Figure 2:
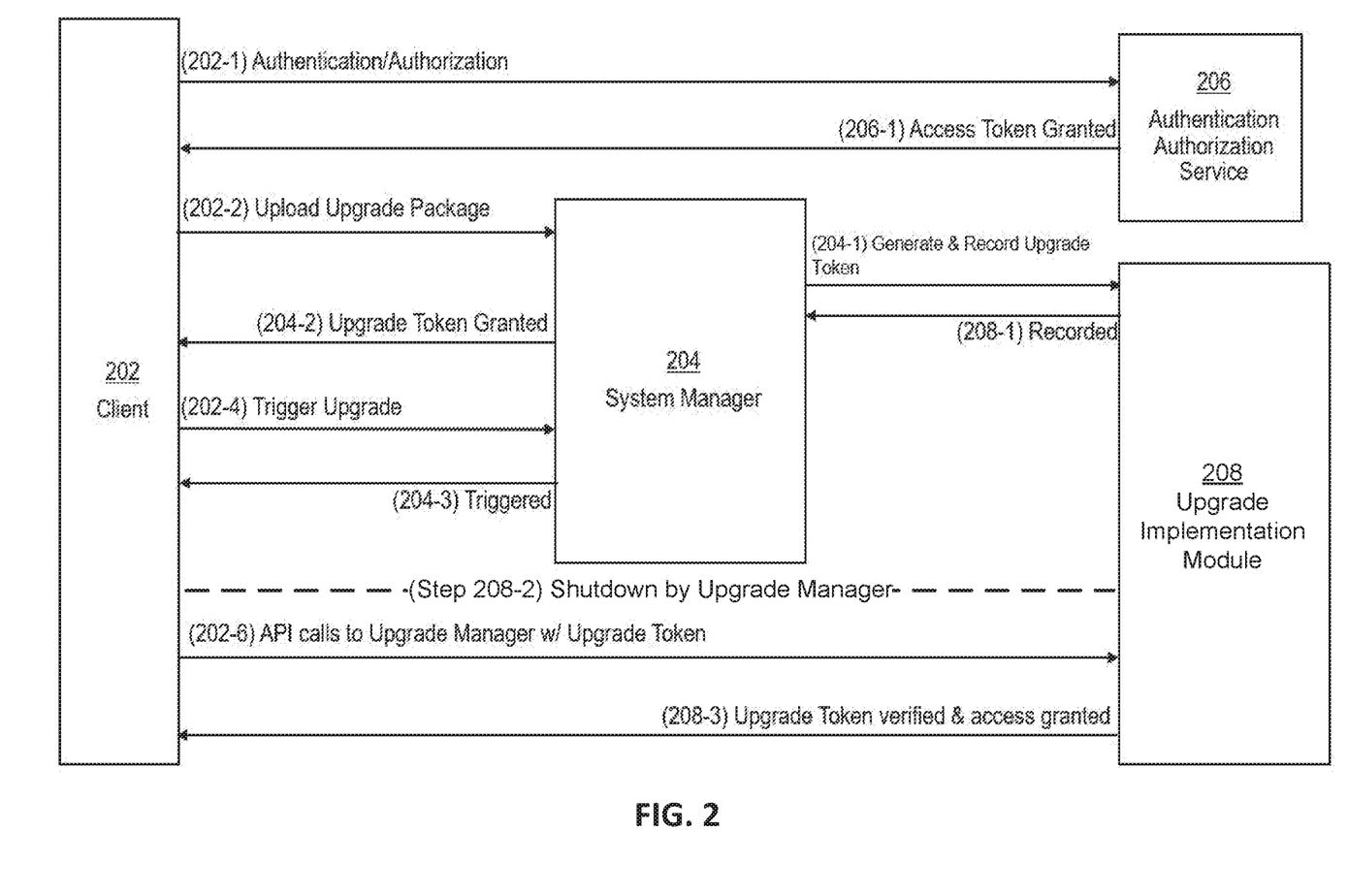
FIG. 2 is a block diagram illustrating an example environment according to one or more embodiments of the disclosure.

A shown in FIG. 2, a client system 202 requests authentication and authorization service 206 access to a system manager 204 and a plurality of services associated with the system manager 204. (Step 202-1) The authentication and authorization service 206 grants one or more access tokens to the client 202 (Step 206-1). The client system 202 uploads an upgrade package to the system manager 204. (Step 202-2) The system manager 204 generates an upgrade token for the client system 202 and sends an instance of the upgrade token to the upgrade implementation module 208. (Step 204-1) The upgrade implementation module 208 records the upgrade token. (Step 208-1). The client system 202 triggers an upgrade via sending an upgrade request to the system manager 204. (Step 202-4). The system manager 202 sends an upgrade trigger response to the client system 202. (Step 204-3). The upgrade implementation module 208 sets the system manager 204, the authentication and authorization service 206 and the related services in an offline mode in order to implement the client system's upgrade package. (Step 208-2) The client system 202 makes a call(s) to the upgrade implementation module 208 via upgrade implementation module APIs, where the calls include the upgrade token generated by the system manager 204. (Step 202-6) The upgrade implementation module 208 receives the call(s) and the corresponding upgrade token. The upgrade implementation module 208 compares the recorded token to the received upgrade token. If there is a match between the recorded token and the received upgrade token, the upgrade implementation module 208 grants the client system 202 access to the upgrade implementation module 208 while the system manager 204, the authentication and authorization service 206 and the related services are the offline mode. (Step 208-3) Upon validating the client system 202, the client system 202 may send the upgrade package 208 to the upgrade implementation module 208 to be implemented by the upgrade implementation module 208. According to other embodiments, the upgrade package may have been previously forwarded to the upgrade implementation module 208 by the system manager 204. According to other embodiments, the upgrade package may be accessed by the upgrade implementation module 208 in storage related to the system manager 204.

Figure 3:
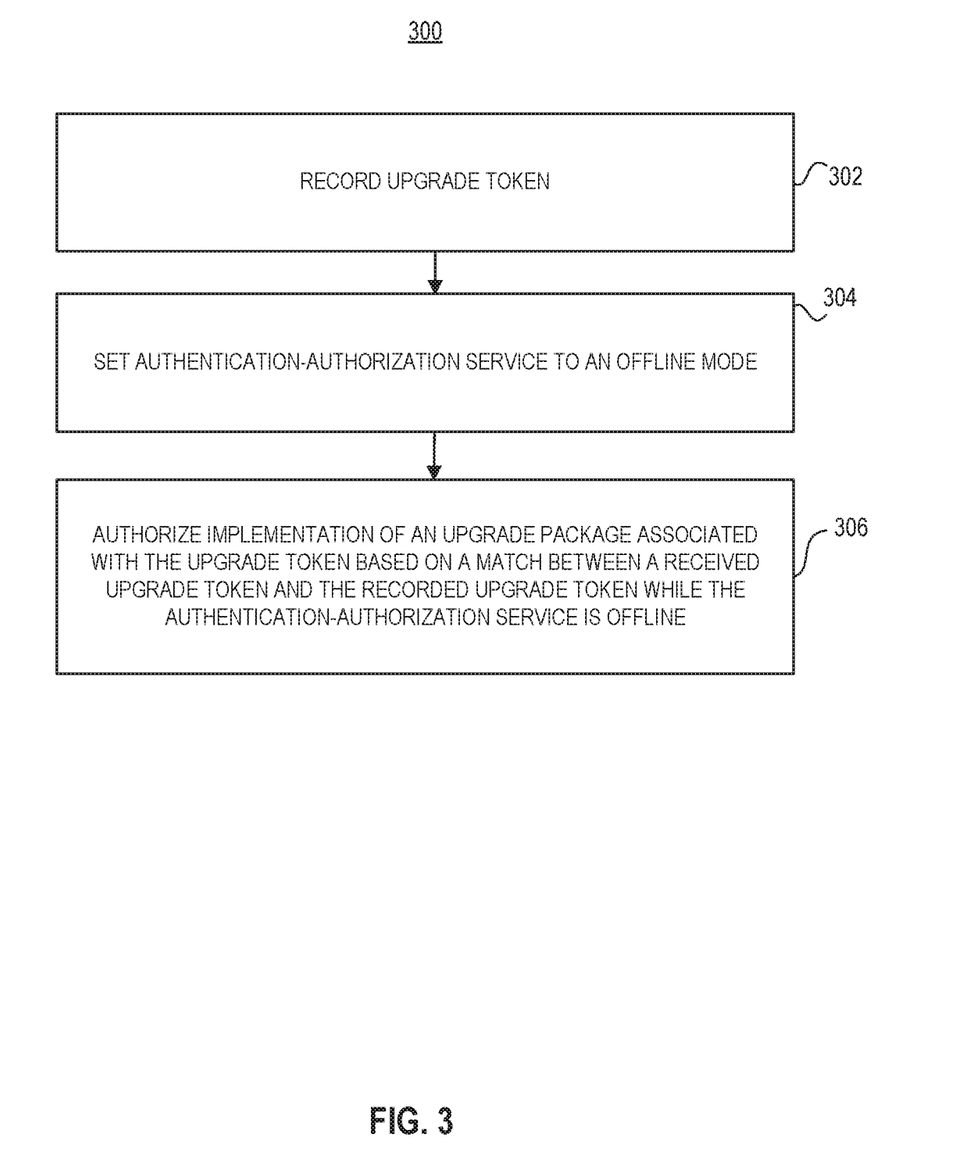
FIG. 3 is a flow diagram illustrating an example method according to one or more embodiments of the disclosure.

FIG. 3 is a flow diagram that illustrates an example method 300 where the upgrade implementation module, at step 302, records an upgrade token. According to some embodiments, the upgrade token is generated by the system manager 204 associated with a plurality of services with protected access via access tokens generated by the authentication-authorization service 206. The upgrade token is generated by the system manager 204 in response to a client system 202 uploading the upgrade package to the system manager 204. The upgrade token may be generated by the system manager 204 to be associated with a specific upgrade package(s) and to have a duration of validity that corresponds to a life cycle time range of the specific upgrade package(s). For example, the upgrade token may include data that represents a universally unique identifier paired to an identity of a specific upgrade package(s). According to various embodiments, the upgrade token may expire upon implementation of the specific upgrade package(s). Some embodiments may include an upgrade token that has an expiration period that is shorter than the life cycle time range of the specific upgrade package(s). According to various embodiments, the system manager 204 may generate the upgrade token such that it can be refreshed on the basis of a failed implementation of the specific upgrade package(s). The upgrade token represents that the client system 202 has been determined as an authorized resource. As such, the system manager 204 grants the upgrade token to the client system 202 and provides a copy of the upgrade token for upgrade implementation module 208 for recording. Since the upgrade implementation module 208 has a record of the upgrade token and the client system 202 has an instance of the same upgrade token, both respective instances of the upgrade token may be compared by the upgrade implementation module 208 to determine whether the client system 202 seeking to implement the upgrade package at the upgrade implementation module 208 is a fraudulent client system. In other embodiments, the client system 202 may be granted access by the authentication-authorization service 206 and generate its own upgrade token that indicates that it is a resource that has been authorized by the authentication-authorization service 206.

At step 304, the upgrade implementation module 208 sets an authentication-authorization service to an offline mode 206. According to various embodiments, the upgrade implementation module 208 may also take the authentication-authorization service offline 206 based on an upgrade request sent from the client system 202 to the system manager 204. The upgrade implementation module 208 may take the authentication-authorization service 206 offline after the upgrade package has been uploaded to the system manager 204 and after the upgrade request has been received by the system manager 204. According to various embodiments, the upgrade implementation module 208 may also take the system manager 204 and the plurality of services offline based on the client system's 202 upgrade request.

According to various embodiments, the plurality of services, the authentication-authorization service 206 and the system manager 204 may be Java-based software running within a data protection & replication platform in an active (or online) mode. In order to halt and set each to an offline mode, the upgrade implementation module 208 sends a message bus or a respective API call to each component (i.e. services, auth. service 206, system manager 204) that includes a request for the receiving component to initiate a shutdown process. The upgrade implementation module 208 call to each component may include a unique identifier or code. At the end of the shutdown process, each component may run a validation check to validate whether any errors occurred during its shutdown process. A final phase of the shutdown process may be to send a message, which includes the unique identifier or code included the API call, to the upgrade implementation module 208 that signifies that shutdown was successful. After sending the message, the component may finalize shutdown and set itself to an online mode as requested by the upgrade implementation module 208. Upon receipt of a validated shutdown message from a component, the upgrade implementation module 208 may check the message to determine whether it includes the correct unique identifier or code. If the correct unique identifier or code is included, the upgrade implementation module 208 may update a local offline service map to indicate that the respective component that sent the message is currently set to an offline mode.

At step 306, the upgrade implementation module 208 authorizes implementation of an upgrade package in response to determining a match between a received upgrade token and the recorded upgrade token in order to prevent unauthorized access of the upgrade implementation module 208 while the authentication-authorization service 206 is offline. According to some embodiments, the client system 202 sends a call to the upgrade implementation module 208 via the upgrade implementation module's API. The call includes an instance of the upgrade token previously granted by the system manager 204. The upgrade implementation module 208 receives the call and the upgrade token from the client system 202. The upgrade implementation module 208 determines whether there is a match between the received upgrade token and the recorded upgrade token in order to prevent unauthorized access of the upgrade implementation module 208 while the authentication-authorization service 206, the system manager 204 and the services are offline. If there is not a match, the upgrade implementation module 208 does not respond to the call. If there is a match, the upgrade implementation module 208 accesses the upgrade package uploaded to the system manager 204 and implements the upgrade package while the system manager 204, the authentication-authorization service 206 and the plurality of services are offline.

According to various embodiments, the upgrade implementation module 208 may not attempt to determine whether the upgrade token received from the client system 202 matches the recorded upgrade token until the upgrade implementation module 208 receives a message from each component (i.e. services, auth. service 206, system manager 204) indicating that each component performed a successful shutdown process. If the upgrade implementation module 208 receives the upgrade token from the client system 202 before receiving validated shutdown messages from each component, the upgrade implementation module 208 may buffer the client system's call for a pre-defined amount of time. However, if the upgrade implementation module 208 has still not received all the validated shutdown messages at the end of the buffer's pre-defined amount of time, the upgrade implementation module 208 may send a time out message back to the client system 202.

According to various embodiments, the upgrade implementation module 208 may include a fraud detection module. The fraud detection module may monitor for continuous or repetitive API calls that are being received from a client system. For example, if a particular client system continually sends an API call after a pre-defined number of buffer time outs, the upgrade implementation module 208 may pause from comparing any upgrade token received from that particular client system. According to various embodiments, the fraud detection module may send a request to the system manager 204 and/or the authentication-authorization service 206 for fraudulent entity data before the manager 204 and the service 206 are set to an offline mode. The fraud detection module may receive current fraudulent entity data to be stored locally to the upgrade implementation module 208. The current fraudulent entity data may provide the upgrade implementation module 208 with data for identifying fraudulent client systems that have recently attempted to gain access to the data protection & replication platform. As such, the upgrade implementation module 208 can immediately reject an API call from a client system that matches the locally stored current fraudulent entity data rather than utilize resources to determine a match between upgrade tokens. In addition, when the manager 204 and the service 206 return to an online mode, the upgrade implementation module 208 can send the manager 204 and the service 206 updated fraudulent entity data that indicates whether any known fraudulent entities re-attempted to gain access. In addition, the upgrade implementation module 208 can send the manager 204 and the service 206 data about any token comparison events that failed to match and data about the client systems that sent invalidated upgrade tokens.

As noted, the operations (or steps) shown in the above method 300 are not necessarily performed in the order indicated and may be performed in parallel, as a single operation, or as multiple operations.

Figure 4:
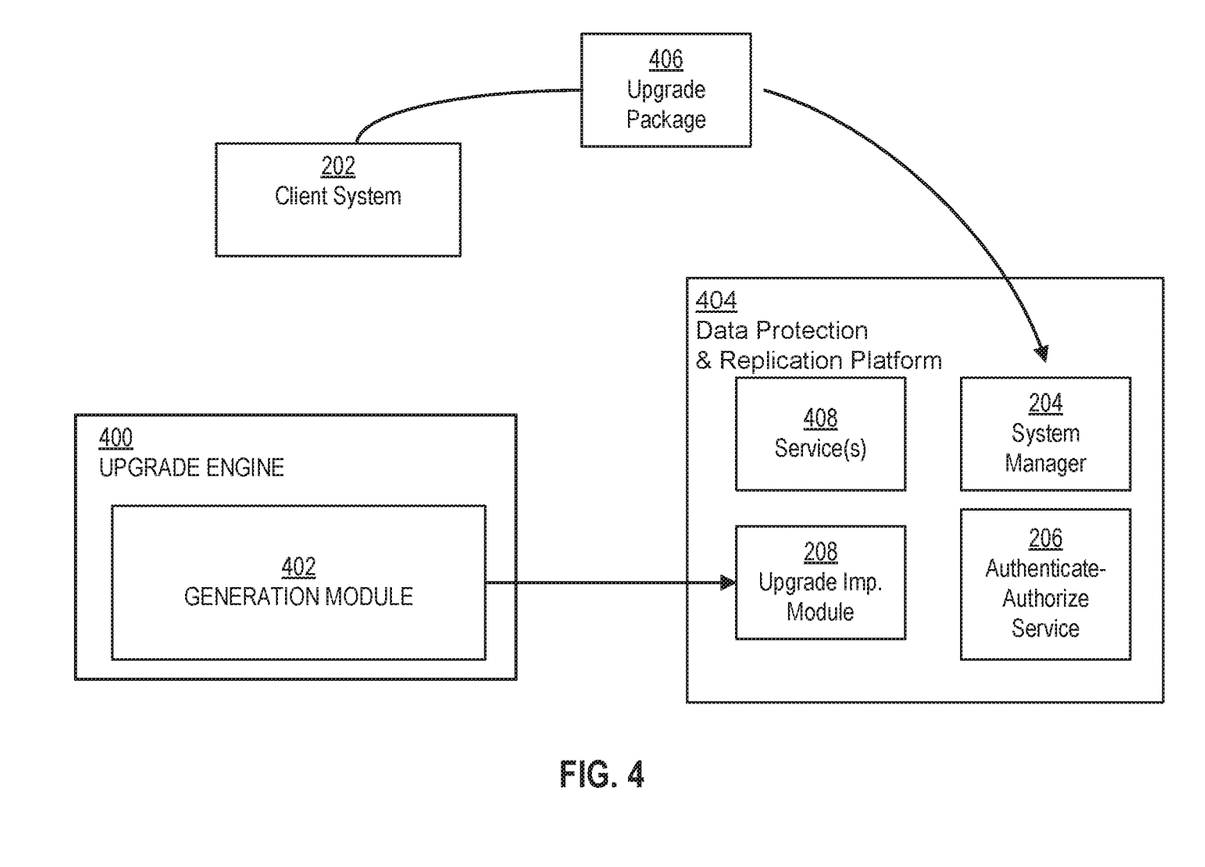
FIG. 4 is a block diagram illustrating an example environment according to one or more embodiments of the disclosure.

As shown in FIG. 4, the Upgrade Engine 400 includes a generation module 402 for generating the upgrade implementation module 208 for deployment of the upgrade implementation module 208 within a data protection & replication platform 404 and remotely from the Upgrade Engine 400. According to some embodiments, the data protection & replication platform 404 includes the system manager 204, the authentication-authorization service 206 and a plurality of services 408 related to the platform 404. It is understood that various aspects illustrated by FIG. 1 may be included in and deployed by the data protection & replication platform 404.

The client system 202 sends an upgrade package 406 to the platform 404 to be implemented by the upgrade implementation module 208 after the system manager 204, the authentication-authorization service 206 and the services 408 have been shut down and taken offline by the upgrade implementation module 208. The client system 202 sends the upgrade token in a request via the upgrade implementation module's APIs. As described herein, the upgrade implementation module 208 determines a match between the client system's upgrade token and the previously recorded upgrade. Such a match authorizes the client system's 202 to make calls through the upgrade implementation module's APIs requesting implementation of the upgrade package 406. According to various embodiments, the upgrade package 406 may include software updates, version control instructions, instructions for adding new functionality, instructions for deleting functionality, instructions for replacing functionality and/or instructions for pausing functionality in the platform 404. It is understood that such functionality may be related to updating, deleting, repairing and/or pausing any or all aspects illustrated in FIG. 1.

According to some embodiments, the Upgrade Engine 400 may generate multiple versions of the upgrade package 406, whereby each successive version of the upgrade package 406 is different than a previous upgrade package version. The client system 202 may download the various upgrade package versions from the Upgrade Engine 400 to be sent to the platform 404 in order to be implemented by the upgrade implementation module 208 in the platform 404— while the system manager 204, authentication-authorization service 206 and services 408 are offline. In some embodiments, the Upgrade Engine 400 itself may be a component of the platform 404.

It is understood that the Upgrade Engine 400 includes source code, software modules and/or software instructions to perform and/or execute the steps, methods and operations described herein. It is further understood that by generating the upgrade implementation module 208, the Upgrade Engine 400 generates, builds, gathers, and/or packages source code, software modules and/or software instructions for the upgrade implementation module 208 to implement and/or execute the steps, methods and operations remotely from the Upgrade Engine 400. According to some embodiments, it is understood that a software developer(s) may operate the Upgrade Engine 400.

Figure 5:
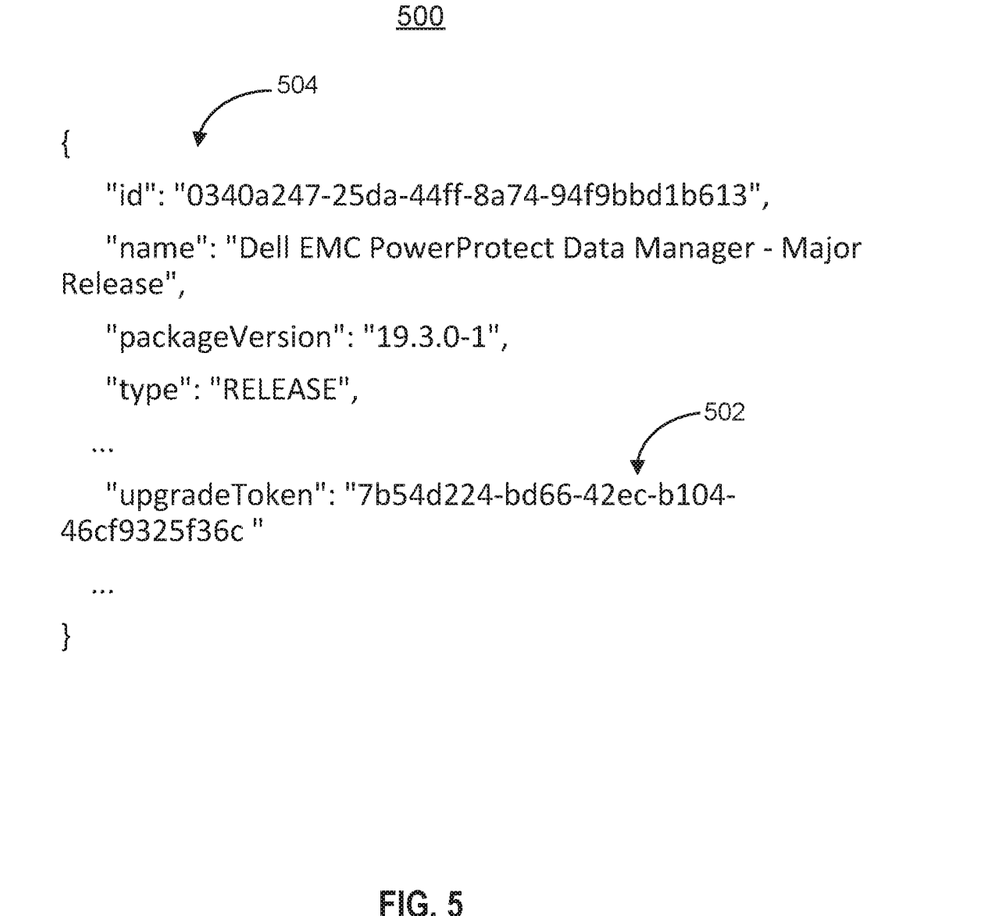
FIG. 5 is a block diagram illustrating an upgrade token data according to one or more embodiments of the disclosure.

As shown in FIG. 5, an upgrade token data 500 that represents an upgrade token identifier 502, which acts as the upgrade token indicative of an authorized resource. The upgrade token data 500 further includes an identity of the upgrade package 504 that is to be implemented on the basis of validating the upgrade token identifier 502.

Figure 6:
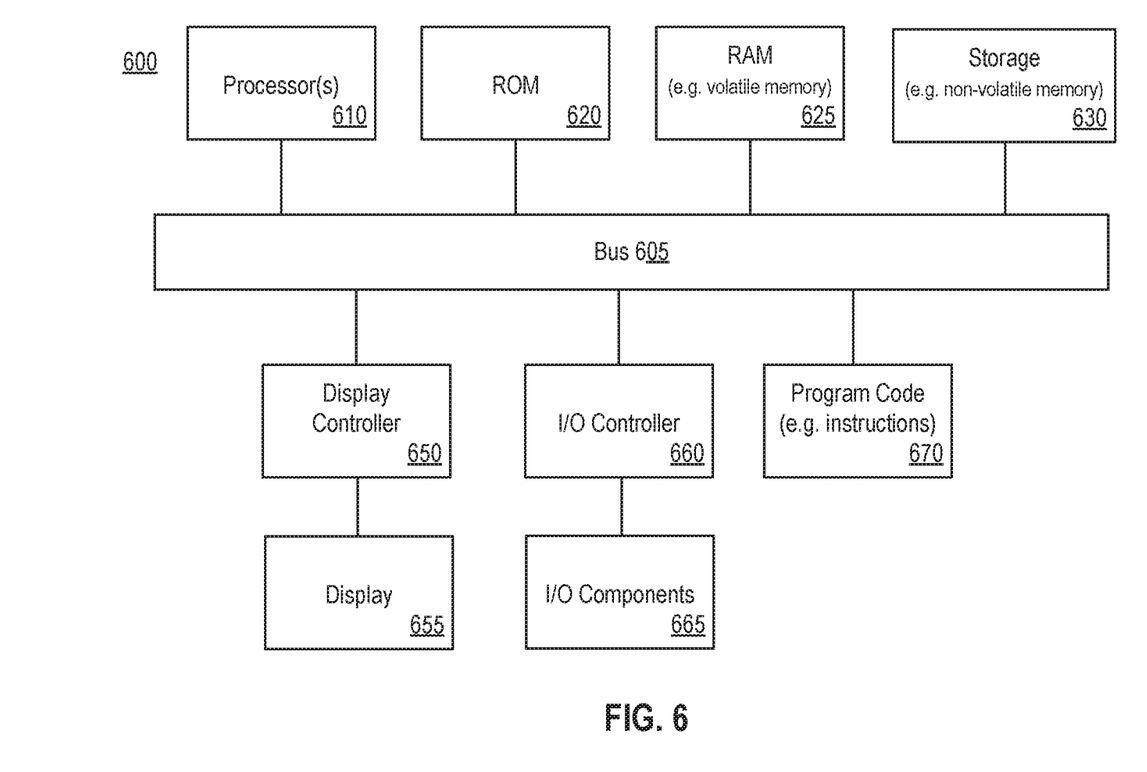
FIG. 6 is a block diagram illustrating an example of a computing system that may be used in conjunction with one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein. Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   generate an upgrade token;
   record the upgrade token;
   set an authentication-authorization service to an offline mode, the authentication-authorization service being available to grant and validate access tokens when in an online mode and being unavailable to grant and validate the access tokens when in the offline mode;
   determine a match between a received upgrade token and the recorded upgrade token in order to prevent unauthorized access of an upgrade implementation module while the authentication-authorization service is offline; and
   authorize implementation of an upgrade package associated with the upgrade token by the upgrade implementation module while the authentication-authorization service is in the offline mode on a basis of the match.

2. The system of claim 1, wherein the plurality of instructions, when executed, further cause the one or more processors to:
   generate the upgrade token at a system manager;
   grant the upgrade token to the client system by the system manager;
   receive the upgrade token for recordation, wherein the system manager is associated with a plurality of services with protected access by the authentication-authorization service, the plurality of services comprising respective services in a cloud-based data protection and replication platform.

3. The system of claim 2, wherein the authentication-authorization service is operative to grant respective access tokens for accessing any of the plurality of services and wherein the plurality of instructions, when executed, further cause the one or more processors to receive the upgrade token at the upgrade implementation module.

4. The system of claim 2, wherein the plurality of instructions, when executed, further cause the one or more processors to:
   receive, at the system manager, an upgrade package uploaded by the client system;
   generate the upgrade token at the system manager in response to receiving the upgrade package; and
   receive an upgrade request at the system manager.

5. The system of claim 4, wherein set an authentication-authorization service to an offline mode comprises:
   set the authentication-authorization service to the offline mode after the client system has sent the upgrade request.

6. The system of claim 2, wherein the plurality of instructions, when executed, further cause the one or more processors to:
   set the system manager to a system manager offline mode; and
   set each service in the plurality of services to a respective service offline mode.

7. The system of claim 6, wherein the plurality of instructions, when executed, further cause the one or more processors to:
   determine the match to prevent unauthorized access of the upgrade implementation module while the authentication-authorization service, the system manager and the services are in the respective offline modes.

8. A computer-implemented method, comprising:
   generating an upgrade token;
   recording the upgrade token;
   setting an authentication-authorization service to an offline mode, the authentication-authorization service being available to grant and validate access tokens when in an online mode and being unavailable to grant and validate the access tokens when in the offline mode;
   determining a match between a received upgrade token and the recorded upgrade token in order to prevent unauthorized access of an upgrade implementation module while the authentication-authorization service is offline; and
   authorizing implementation of an upgrade package associated with the upgrade token by the upgrade implementation module while the authentication-authorization service is in the offline mode on a basis of the match.

9. The computer-implemented method of claim 8, further comprising:
   generating the upgrade token at a system manager;
   granting the upgrade token to the client system by the system manager;
   receiving the upgrade token for recordation, wherein the system manager is associated with a plurality of services with protected access by the authentication-authorization service, the plurality of services comprising respective services in a cloud-based data protection and replication platform.

10. The computer-implemented method of claim 9, wherein the authentication-authorization service is operative to grant respective access tokens for accessing any of the plurality of services and wherein receiving the upgrade token for recordation includes receiving the upgrade token at the upgrade implementation module.

11. The computer-implemented method of claim 10, further comprising:
    receiving, at the system manager, an upgrade package uploaded by the client system;
    generating the upgrade token at the system manager in response to receiving the upgrade package; and
    receiving an upgrade request at the system manager.

12. The computer-implemented method of claim 11, further comprising:

setting the authentication-authorization service to the offline mode after the client system has sent the upgrade request.

13. The computer-implemented method of claim 9, further comprising:
setting the system manager to a system manager offline mode; and
setting each service in the plurality of services to a respective service offline mode.

14. The computer-implemented method of claim 13, further comprising:
determining the match to prevent unauthorized access of the upgrade implementation module while the authentication-authorization service, the system manager and the services are in the respective offline modes.

15. A computer program product comprising a non-transitory computer-readable medium having a computer-readable program code embodied therein to be executed by one or more processors, the program code including instructions to:
generate an upgrade token;
record the upgrade token;
set an authentication-authorization service to an offline mode, the authentication-authorization service being available to grant and validate access tokens when in an online mode and being unavailable to grant and validate the access tokens when in the offline mode;
determine a match between a received upgrade token and the recorded upgrade token in order to prevent unauthorized access of an upgrade implementation module while the authentication-authorization service is offline; and
authorize implementation of an upgrade package associated with the upgrade token by the upgrade implementation module while the authentication-authorization service is in the offline mode on a basis of the match.

16. The computer program product of claim 15, wherein the program code includes further instructions to:
generate the upgrade token at a system manager;
grant the upgrade token to the client system by the system manager;
receive the upgrade token for recordation, wherein the system manager is associated with a plurality of services with protected access by the authentication-authorization service, the plurality of services comprising respective services in a cloud-based data protection and replication platform.

17. The computer program product of claim 16, wherein the authentication-authorization service is operative to grant respective access tokens for accessing any of the plurality of services and wherein the program code includes further instructions to receive the upgrade token at the upgrade implementation module.

18. The computer program product of claim 16, wherein the program code includes further instructions to:
receive, at the system manager, an upgrade package uploaded by the client system;
generate the upgrade token at the system manager in response to receiving the upgrade package; and
receive an upgrade request at the system manager.

19. The computer program product of claim 18, wherein the program code includes further instructions to:
set the authentication-authorization service to the offline mode after the client system has sent the upgrade request.

20. The computer program product of claim 16, wherein the program code includes further instructions to:
set the system manager to a system manager offline mode;
set each service in the plurality of services to a respective service offline mode; and
wherein determine a match between a received upgrade token and the recorded upgrade token comprises:
determine the match to prevent unauthorized access of the upgrade implementation module while the authentication-authorization service, the system manager and the services are in the respective offline modes.

* * * * *